United States Patent [19]

Bastioli et al.

[11] Patent Number: 5,409,973
[45] Date of Patent: Apr. 25, 1995

[54] POLYMER COMPOSITION INCLUDING DESTRUCTURED STARCH AND AN ETHYLENE COPOLYMER

[75] Inventors: Catia Bastioli; Vittorio Bellotti, both of Novara; Gianfranco Del Tredici, Sesto Calende, all of Italy

[73] Assignee: Butterfly S.r.l., Ravenna, Italy

[21] Appl. No.: 56,613

[22] Filed: May 3, 1993

Related U.S. Application Data

[63] Continuation of Ser. No. 671,734, Feb. 28, 1992, abandoned.

[30] Foreign Application Priority Data

Aug. 7, 1989 [IT] Italy ................... 67691/89

[51] Int. Cl.⁶ .................... C08J 9/12; C08K 5/10; C08K 5/06
[52] U.S. Cl. .................... 524/53; 524/52; 524/312; 524/377; 524/387
[58] Field of Search ............ 524/52, 53, 377, 387, 524/312

[56] References Cited

U.S. PATENT DOCUMENTS

| | | | |
|---|---|---|---|
| 3,652,542 | 3/1972 | Hjermstad | 260/233.3 R |
| 4,673,438 | 6/1987 | Wittwer | 106/126 |
| 4,863,655 | 9/1989 | Lacourse et al. | 264/53 |
| 4,900,361 | 2/1990 | Sachetto et al. | 106/213 |
| 5,035,930 | 7/1991 | Lacourse et al. | 428/35.6 |
| 5,043,196 | 8/1991 | Lacourse et al. | 428/35.6 |
| 5,095,054 | 3/1992 | Lay et al. | 524/47 |

FOREIGN PATENT DOCUMENTS

| | | |
|---|---|---|
| 0032802 | 7/1981 | European Pat. Off. |
| 0282451 | 9/1988 | European Pat. Off. |
| 0298920 | 1/1989 | European Pat. Off. |
| 0304401 | 2/1989 | European Pat. Off. |
| 0326517 | 8/1989 | European Pat. Off. |
| 0327505 | 8/1989 | European Pat. Off. |
| 0404727 | 11/1989 | European Pat. Off. |
| 0388924 | 9/1990 | European Pat. Off. |
| 0391853 | 10/1990 | European Pat. Off. |
| 0400532 | 12/1990 | European Pat. Off. |
| 0404723 | 12/1990 | European Pat. Off. |
| 0404728 | 12/1990 | European Pat. Off. |
| 0407350 | 1/1991 | European Pat. Off. |
| 0408501 | 1/1991 | European Pat. Off. |
| 0408502 | 1/1991 | European Pat. Off. |
| 0408503 | 1/1991 | European Pat. Off. |
| 0409781 | 1/1991 | European Pat. Off. |
| 0409782 | 1/1991 | European Pat. Off. |
| 0409783 | 1/1991 | European Pat. Off. |
| 0409788 | 1/1991 | European Pat. Off. |
| 0409789 | 1/1991 | European Pat. Off. |
| 2190093 | 11/1987 | United Kingdom |
| 8802313 | 3/1988 | United Kingdom |
| WO90/10671 | 9/1990 | WIPO |
| WO91/02023 | 2/1991 | WIPO |
| WO91/02024 | 2/1991 | WIPO |
| WO91/02025 | 2/1991 | WIPO |

OTHER PUBLICATIONS

*Chemical Abstracts,* vol. 7, No. 8, p. 47, Abstract No. 60151n, F. H. Otey et al., "Starch-based blown films" (Aug. 24, 1987).

Otey, F. H. et al., Ind. Eng. Chem. Res. 26(8):1659-63 (1987), "Starch-Based Blown Films".

*Primary Examiner*—Paul R. Michl
*Assistant Examiner*—LaVonda R. DeWitt
*Attorney, Agent, or Firm*—Mark E. Waddell; Bryan Cave

[57] ABSTRACT

Biodegradable compositions comprising destructured starch and an ethylene-vinyl acetate copolymer are prepared by mixing the starch and the copolymer in an extruder heated to a temperature of between 80° and 180° C. and bringing the water content to below 6% and any ammonia content to below 0.2% by weight. The composition fed to the extruder may optionally include up to 40% by weight of an ethylene-vinyl alcohol polymer, as well as a starch destructuring agent and a high boiling plasticizer.

24 Claims, No Drawings

POLYMER COMPOSITION INCLUDING DESTRUCTURED STARCH AND AN ETHYLENE COPOLYMER

This is a continuation of U.S. application Ser. No. 07/671,734, filed Feb. 28, 1992, now abandoned.

The present invention relates to polymer compositions including starch and an ethylene copolymer useful for the production of articles of biodegradable plastics material and to a method for their preparation.

Compositions which can be formed into films and which are constituted by starch and an ethylene copolymer, particularly an ethylene-acrylic acid copolymer (EAA) are described in U.S. Pat. No. 4,133,784. These compositions are transformed into flexible, water-resistant, heat sealable and biodegradable films by casting, simple extrusion or milling techniques. These processes are, however, slow and very expensive and, moreover, with certain starch contents necessary to achieve the desired mechanical properties, the degree of biodegradability and UV stability of the products are greatly compromised.

It has been proposed in U.S. Pat. No. 4,337,181 that a sufficient quantity of neutralising agent, such as ammonia or an amine, should be added to the starch-EAA copolymer composition to neutralise some or all of the acid groups in the EAA, and that the formulation thus obtained, with a moisture content between 2 and 10% should then be blow-moulded.

It has also been proposed in Ind. Eng. Chem. Res. 1987, 26, pp. 1659–1668 that urea and/or polyols should be added to the starch-EAA copolymer compositions in order to facilitate the preparation and improve the resulting films from a cost and qualitative point of view. The effect of the presence of urea is to enable the crystalline structure of the starch to be destroyed by small quantities of water and hence to enable granules for film forming to be produced directly from a composition with a water content of around 16% and also to avoid the need to premix the starch-EAA copolymer mixture with large quantities of water in a very complex mixer before the extrusion process.

Unpublished Italian patent application No. 67413-A/89 and the corresponding EP 90110070.1 describe compositions which can be formed into films with good mechanical properties and into moulded articles and which include a destructured starch and an ethylene-vinyl alcohol copolymer. In this case, the compositions are preferably produced by the mixing, in a heated extruder, of the ethylene-vinyl alcohol copolymer with a starch component constituted by a destructured starch compositions produced beforehand by the mixing of starch in an extruder with a high-boiling plasticizer and a destructuring agent such as, for example, urea.

The compositions thus obtained are suitable both for film forming by extrusion and blowing and for the production of moulded articles.

Within the scope of the research carried out by the Applicant in relation to the production of biodegradable polymer compositions based on destructured starch, other ethylene copolymers have been identified as being compatible with the starch, thus making available new polymer compositions useful both for the formation of films and for the production of moulded articles.

The subject of the invention is constituted by a polymer composition including destructured starch and a copolymer selected from the group consisting of ethylene-vinyl acetate having a vinyl acetate molar content of from 5 to 90%, modified ethylene-vinyl acetate having from 5 to 90% of hydrolized acetate groups, ethylene-glycidyl acrylate, ethylene-methyl methacrylate, ethylene-maleic anhydride, and mixtures thereof.

Of these polymers, the above defined ethylene-vinyl acetate copolymer is preferred particularly for the production of compositions for films and particularly preferred are ethylene-vinyl acetate copolymers having a vinyl acetate molar content of from 12 to 80%. Copolymers of ethylene-vinyl acetate are available commercially. For example, the ELVAX (registered trade mark) copolymer can conveniently be used.

The other ethylene copolymers mentioned above, which, as a result of the tests carried out by the Applicant, have been found to be compatible with starch and therefore able to form starch and copolymer composites, may be considered in dependence on the specific properties desired for the biodegradable articles to be produced.

The term "starch" as used in the present description and in the claims covers in general all the starches of natural or vegetable origin composed essentially of amylose and amylopectin. They can be extracted from various plants, such as, for example, potatoes, rice, tapioca, maize and cereals such as rye, oats and wheat. Maize starch is preferred. The term "starch" also covers modified starches whose acidity index has been reduced to between 3 and 6, as well as potato starch in which the type and concentration of the cations associated with the phosphate group have been modified. Starch ethoxylates, starch acetates, cationic starches, oxidised starches, cross-linked starches and the like may be used in the preparation of the compositions according to the invention.

In the composition according to the invention, destructured starch and the ethylene copolymer may be present in a ratio of from 1:9 to 9:1, preferably from 1:4 to 4:1.

The ethylene copolymers mentioned above may be used in mixtures with each other or, to advantage, may be mixed with an ethylene-acrylic acid (EAA) copolymer whose use in biodegradable starch compositions is described in U.S. Pat. No. 4,133,784, or with an ethylene-vinyl alcohol copolymer (EVOH) as described in as yet unpublished EP 90110070.1.

The EAA copolymer, which may be present in the composition at concentrations of up to 25% by weight, is a water-dispersible copolymer produced by the copolymerisation of a mixture comprising from 3 to 30%, preferably 20%, by weight of acrylic acid and correspondingly from 97 to 70%, preferably 80%, by weight of ethylene. Polyvinyl alcohol may also be used as the polymeric additive to the composition.

The preferred ethylene-vinyl alcohol copolymer has an ethylene content of from 10 to 90% by weight, preferably from 10 to 40% by weight (15–50% mol), more preferably 30–45% mol, with a melt flow index (210° C., 2.16 Kg) of between 2 and 50, preferably between 6 and 20.

Further preferred features for the EVOH copolymer are as follows:

| | |
|---|---|
| Intrinsic viscosity, $[\eta]$ (in DMSO at 30°) | 0.50–0.9 preferably 0.65–0.80 |
| Molecular weight distribution Mw/Mn | 1.3–4 |

| | |
|---|---|
| (GPC in tetrahydrofurane) | |
| Melting point temperature | <180° C. |
| | preferably 160–170° C. |
| Hydrolysis degree* | 90–99.9% |

*Basic hydrolysis and titration of the residual base with acid.

The EVOH copolymer is preferably used at a concentration up to 40% by wt with respect to the weight of the composition.

Particularly when it is desired to improve the toughness and elongation (breaking strain) properties, a preferred embodiment of the invention contemplates the use of a composition wherein the synthetic polymer portion consists of or comprises a blend of the above defined EVOH and EVA copolymers. It has been found that the addition of EVA to blends based on starch and EVOH provides for a reduction of the Young's modulus and for a significant increase of the breaking strain and toughness properties of the material. However when the vinyl acetate content is below a value of about 15% by wt or 5% by mol, the compatibility between the components becomes too low and homogenous film cannot be obtained. On the other hand the nature of the starch does not seem to significantly influence the properties of the material.

In this embodiment the weight ratio between EVOH and EVA copolymers is preferably in the range of from 8:1 to 2:1.

The EVA copolymer in the composition according to the invention, is generally used at a concentration of from 3–40% by wt, preferably 3–20% by wt with respect to the weight of the composition.

The modified EVAs having hydrolized acetate groups, which may be defined as ethylene-vinyl acetate-vinyl alcohol terpolymers, when used in a blend of EVOH, EVA and starch, provide for an increased compatibility of the components so that a higher modulus and a higher breaking strain are obtained.

Cross-linking agents, such as formaldehyde, para-formaldehyde, paraldehyde and epichlohydrin may also be present. Additives for imparting specific properties to the articles for which the composition is intended may also be introduced into the composition. These additives include UV stabilizers, flame-proofing agents, fungicides, herbicides, antioxidants, fertilisers, opacifying agents, stabilizers, plasticizers, antiblocking agents, and lubricants.

The method of preparing the compositions according to the invention is carried out in an extruder at a temperature of between 80° and 180° C., under conditions such as to destructure the starch.

When the ethylene copolymer is EVA or a blend of EVA and EAA the temperature within the extruder is the range of 80°–140° C., preferably 90°–120C.

In order to encourage the destructuring of the starch, urea may to advantage be added to the composition in quantities of up to 20% by weight of the weight of the starch component. Other destructuring agents include alkali metal or alkaline earth metal hydroxides. Ammonia may be added to the composition supplied to the extruder and its concentration is reduced to below 0.2% by weight as a result of the extrusion.

A high-boiling plasticizer, such as polyethylene glycol, ethylene glycol, propylene glycol, sorbitol and preferably glycerine, may also be added to the composition in a quantity of from 0.05 to 100% by weight of the weight of the starch, preferably from 20 to 60% by weight.

The process of destructuring the starch in the extruder is preferably carried with the addition of water the concentration of which may reach values of up to 20% by weight, preferably up to 15%, of the total weight of the composition supplied. This value includes the intrinsic bound water content of the starch used and any water added as required. The water content is at any rate reduced to values below 6%, preferably below 4% by weight, by degassing at the output of the extruder or in an intermediate degassing stage interposed between a mixing stage and a transportation and compression stage, as described in Italian Patent Application No. 67666-A/89 in the name of the Applicant, or even by the drying of the granulate at 70° C. for 8 hours after the extrusion.

If a mixture of ethylene copolymers and, in particular, a mixture of ethylene-vinyl acetate and ethylene acrylic acid is used, a blend is preferably produced beforehand by the mixing of the copolymers in an extruder and the pelletising of the extrusion. In a second stage, the pellets are then mixed with starch with the addition of water and any of the destructuring and plasticizing agents mentioned above, in a heated extruder under conditions such as to destructure the starch.

Further methods for preparing the polymer compositions which are the subject of the invention are described in Italian Patent Application No. 67418-A/89 in the name of the Applicant.

Further advantages and characteristics of the invention will become clear from the following examples, provided purely by way of illustration, where all concentrations are in % by wt, unless otherwise indicated.

EXAMPLE 1

A HAAKE REOMEX Model 292 extruder with an L/D ratio of 19, a screw diameter of 19 mm and a compression ratio of 1:3 was supplied with a composition constituted by:

38.5% of the ethylene-vinyl acetate copolymer ELVAX 260 (registered trade mark, 28% wt vinyl acetate (11.2% mol)

38.5% of the Dow Chemical copolymer EAA 5981 containing 20% of acrylic acid, 11.5% of urea, 3.8% of ammonia, and 7.7% of water.

The extrusion temperature was approximately 100° C. and the speed of the screw approximately 60 rpm. 50 parts of the product thus obtained were mixed with 50 parts of the starch GLOBE 03401 Cerestar (registered trade mark) and 10 parts of water, and the mixture was extruded with the same extruder at a temperature of between 90° and 110° C. The extrusion thus obtained was formed into pellets with a water content of 4% and the pellets were supplied to the same extruder with the use of a film-blowing head, at a temperature of 100° C. and a screw rotation rate of 40 rmp. Rectangular test pieces for tensile testing according to ASTM 882 were formed from the films which were approximately 100 microns thick.

The test pieces were conditioned at 23±° C. and at 55±5% relative humidity for 24 hours. The mechanical strength tests gave the following results expressed as average values:

| Young's modulus | 91 MPa |
|---|---|
| breaking strain | 93.8% |
| breaking stress | 14.8 MPa |

EXAMPLE 2

The extruder described in Example 1 was supplied with a composition comprising:
76% of copolymer ELVAX - 260
14% of urea
10% of water
and was operated under the same conditions as described in Example 1.

50 parts of the product thus obtained were mixed in an extruder at 90° C. and a screw rotation rate of 40 rpm with 50 parts of the starch GLOBE 03401 Cerestar (registered trade mark) and 7 parts of water.

Test pieces of the film were made as described in Example 1 and when subjected to mechanical strength tests gave the following values:

| Young's modulus | 90 MPa |
|---|---|
| breaking strain | 120% |
| breaking stress | 7 MPa |

EXAMPLES 3-22

In all the following examples, the components were pre-mixed and then fed from a Licoarbo DC10 batcher to a Haake Reomex extruder, model 252, with L/D ratio of 19, screw diameter of 19 mm, and a compression ratio of 1:3, with the screw revolving at 45 rpm.

The temperature profile in the extruder was as follows:

| feeding zone | 30° C. |
|---|---|
| first zone | 90° C. |
| second zone | variable as shown in Table 1 hereinafter |
| third zone | 130° C. |
| fourth zone | 100° C. |

The extruded material was formed into pellets, was compression moulded in a heated press at temperatures of from 110° and 140° C., to obtain films having the thickness of about 300 microns which, after having been conditioned at 23° C. and 55% relative humidity, were subjected to tensile testing according to ASTM 882.

TABLE 1

| Temperature of the second zone of the extruder | |
|---|---|
| Example | °C. |
| 3-6 | 170 |
| 7 | 140 |
| 8 | 180 |
| 9 | 170 |
| 10-14 | 140 |
| 15-22 | 170 |

In the example the following materials were used:

| Starch | Globe 03401 produced by Cerestar |
|---|---|
| Starch-A | Snowflake 3183 - Cerestar |
| Starch-B | Pea starch with 96% wt amylose - Cerestar (not available on the market) |
| Starch-C | Amisol 05582 (oxydized) - Cerestar |
| Starch-D | Amisol Q TAC 0596 (cationic starch) - Cerestar |
| EVOH-1 | Ethylene-vinyl alcohol copolymer R-20, 40% mol ethylene - Solvay |
| EVOH-2 | Ethylene-vinyl alcohol copolymer obtain- by hydrolysis of Riblene JV 1055, pruduced by Enichem (28% wt vinyl acetate, 1.2% mol) |
| EVOH-3 | Ethylene-vinyl alcohol copolymer "L-6" 29% mol ethylene - Solvay |
| EAA-20 | Ethylene-acrylic acid copolymer, 20% wt (8.8% mol) acrylic acid - Du Pont |
| EAA-9 | Ethylene-acrylic acid copolymer 9% wt (3.7% mol) acrylic acid - Du Pont |
| EVA-1 | Elvax 260 (28% wt (11.2% mol) vinyl acetate) - Du Pont |
| EVA-2 | Elvax 550, 15% wt (5.3% mol) vinyl acetate - Du Pont |
| Modified EVA | Experimental product obtained by partial hydrolysis of EVA having 20% molar content of ethylene, hydrolysis value of the final product 270 |
| Plasticizer | Glycerine containing 15% of a 30% wt water solution of urea or 15% wt of a 30% water solution of ammonia |

The compositions shown in Tables 2-5 were prepared.

TABLE 2

| Compositions containing starch-EVOH-EVA (% wt) | | | | | | | |
|---|---|---|---|---|---|---|---|
| Example | Starch | EVOH-1 | EVOH-2 | EVOH-3 | EVA-1 | EVA-2 | Plast. |
| 3 | 40 | 40 | — | — | — | — | 20 |
| 4 | 40 | 35 | — | — | 5 | — | 20 |
| 5 | 40 | 30 | — | — | 10 | — | 20 |
| 6 | 40 | 25 | — | — | 15 | — | 20 |
| 7 | 40 | — | 30 | — | 10 | — | 20 |
| 8 | 40 | — | — | 30 | 10 | — | 20 |
| 9 | 40 | 30 | — | — | — | 10 | 20 |

TABLE 3

| Compositions based on starch-EAA-EVA (wt %) | | | | | | |
|---|---|---|---|---|---|---|
| Example | Starch | EAA-9 | EAA-20 | EVA-1 | EVA-2 | Plast. |
| 10 | 40 | — | 5 | 35 | — | 20 |
| 11 | 40 | — | 10 | 30 | — | 20 |
| 12 | 40 | — | 15 | 25 | — | 20 |
| 13 | 40 | 10 | — | 30 | — | 20 |
| 14 | 40 | — | 10 | — | 30 | 20 |

TABLE 4

| Compositions based on modified starch-EVOH-EVA (% wt) | | | | | | |
|---|---|---|---|---|---|---|
| Example | Starch-A | Starch-B | Starch-C | Starch-D | EVOH-1 | EVA-1 | Plast. |
| 15 | 40 | — | — | — | 30 | 10 | 20 |
| 16 | — | 40 | — | — | 30 | 10 | 20 |
| 17 | — | — | 40 | — | 30 | 10 | 20 |

TABLE 4-continued

Compositions based on modified starch-EVOH-EVA (% wt)

| Example | Starch-A | Starch-B | Starch-C | Starch-D | EVOH-1 | EVA-1 | Plast. |
|---------|----------|----------|----------|----------|--------|-------|--------|
| 18 | — | — | — | 40 | 30 | 10 | 20 |

TABLE 5

Compositions based on starch-EVOH-modified EVA (% wt)

| Example | Starch | EVOH-1 | EVA | EVA mod. | Plast. |
|---------|--------|--------|-----|----------|--------|
| 19 | 40 | 35 | — | 5 | 20 |
| 20 | 40 | 25 | — | 15 | 20 |
| 21 | 40 | 30 | 5 | 5 | 20 |
| 22 | 40 | 25 | 10 | 5 | 20 |

The mechanical properties of the blends are shown in the following Table 6.

TABLE 6

Mechanical properties of the blends

| Example No. | Breaking stress MPa | Breaking strain. % | Modules MPa | Notes |
|-------------|---------------------|--------------------|-------------|-------|
| 3 | 10 | 90 | 250 | a |
| 4 | 7 | 200 | 60 | a |
| 5 | 6 | 260 | 45 | a |
| 6 | 5 | 350 | 30 | a |
| 7 | nd | nd | nd | a |
| 8 | 10 | 120 | 130 | a |
| 9 | nd | nd | nd | a,d |
| 10 | 1.8 | 330 | 5 | b |
| 11 | 1.9 | 300 | 8 | b |
| 12 | 1.5 | 160 | 9 | b |
| 13 | nd | nd | nd | b,c |
| 14 | nd | nd | nd | b,c |
| 15 | 8 | 210 | 65 | a |
| 16 | 10 | 110 | 80 | a |
| 17 | 7 | 190 | 40 | a |
| 18 | 8 | 90 | 35 | a |
| 19 | 8 | 130 | 190 | a |
| 20 | 7 | 175 | 170 | a |
| 21 | 7 | 180 | 185 | a |
| 22 | 6 | 245 | 130 | a | a = urea in the plasticizer
b = ammonia in the plasticizer
c = unblended phases
nd = not determined
d = non uniform film The films produced from the composition according to the invention are suitable for the production of packaging and mulching materials and also have satisfactory shear- and puncture-strength characteristics. The films are flexible, heat sealable and water-resistant.

We claim:

1. A polymer composition useful for the production of articles of biodegradable plastic material, said composition including destructured starch and a copolymer selected from the group consisting of ethylene-vinyl acetate having a vinyl acetate molar content of from 5 to 90%, modified ethylene-vinyl acetate having from 5 to 90% of hydrolyzed acetate groups, ethylene-glycidyl acrylate, ethylene-methyl methacrylate, ethylene-maleic anhydride and mixtures thereof.

2. A composition according to claim 1, in which the ethylene copolymer and the starch are present in a weight ratio of from 1:4 to 4:1.

3. A composition according to claim 1, wherein the ethylene-vinyl acetate copolymer has a vinyl acetate molar content of from 12 to 80%.

4. A composition according to claim 1, further including up to 25% by weight of ethylene-acrylic acid copolymer with respect to the total weight of the composition.

5. A composition according to claim 1, further including up to 40% by wt of an ethylene-vinyl alcohol copolymer with respect to the total weight of the composition.

6. A polymer composition useful for the production of articles of biodegradable plastic material, said composition including destructured starch and a copolymer selected from the group consisting of ethylene-vinyl acetate having a vinyl acetate molar content of from 5 to 90%, modified ethylene-vinyl acetate having from 5 to 90% of hydrolyzed acetate groups, ethylene-glycidyl acrylate, ethylene-methyl methacrylate, ethylene-maleic anhydride and mixtures thereof
wherein said composition includes up to 40% by wt of an ethylene-vinyl alcohol copolymer with respect to the total weight of the composition, and the copolymer portion consists of ethylene-vinyl alcohol and ethylene-vinyl acetate in a weight ratio of from 2:1 and 8:1.

7. A polymer composition useful for the production of articles of biodegradable plastic material, said composition including destructured starch and a copolymer selected from the group consisting of ethylene-vinyl acetate having a vinyl acetate molar content of from 5 to 90%, modified ethylene-vinyl acetate having from 5 to 90% of hydrolyzed acetate groups, ethylene-glycidyl acrylate, ethylene-methyl methacrylate, ethylene-maleic anhydride and mixtures thereof
wherein said composition includes up to 40% by wt of an ethylene-vinyl alcohol copolymer with respect to the total weight of the composition, and the copolymer portion consists of ethylene-vinyl alcohol, ethylene-vinyl acetate, and modified ethylene-vinyl acetate.

8. A composition according to claim 1, further including a high-boiling plasticizer at a concentration of from 20 to 60% by weight of the weight of the starch component.

9. A composition according to claim 8, wherein the high-boiling plasticizer is selected from a group consisting of glycerine, polyethylene glycol, ethylene glycol, propylene glycol, sorbitol and mixtures thereof.

10. A polymer composition useful for the production of articles of biodegradable plastic material, said composition including destructured starch and a copolymer selected from the group consisting of ethylene-vinyl acetate having a vinyl acetate molar content of from 5 to 90%, modified ethylene-vinyl acetate having from 5 to 90% of hydrolyzed acetate groups, ethylene-glycidyl acrylate, ethylene-methyl methacrylate, ethylene-maleic anhydride and mixtures thereof, further including urea in an amount up to 20% by weight of the weight of the starch component in said composition.

11. A composition according to claim 1, including water at a concentration of no greater than 6% by weight of the total weight of the composition.

12. A polymer composition useful for the production of articles of biodegradable plastic material, said composition including destructured starch and a copolymer selected from the group consisting of ethylene-vinyl acetate having a vinyl acetate molar content of from 5 to 90%, modified ethylene-vinyl acetate having from 5 to 90% of hydrolyzed acetate groups, ethylene-glycidyl acrylate, ethylene-methyl methacrylate, ethylene-maleic anhydride and mixtures thereof, in which the ethylene copolymer is ethylene-vinyl acetate and includes up to 25% of an ethylene-acrylic acid copolymer with respect to the total weight of the composition.

13. Articles in the form of films and moulded articles constituted by a composition according to claim 1.

14. A method for the preparation of a polymer composition useful for the production of articles of biodegradable plastics material, comprising the steps of:
   a. mixing a composition including starch, a copolymer selected from the group consisting of ethylene-vinyl acetate, having a vinyl acetate molar content of from 5 to 90%, modified ethylene-vinyl acetate having from 5 to 90% of hydrolyzed acetate groups, ethylene-glycidyl acrylate, ethylene-methyl methacrylate, ethylene-maleic anhydride and mixtures thereof, water, and optionally urea, ammonia or a mixture thereof in an extruder heated to a temperature of between 80° and 180° C., and
   b. bringing the water content to below 6% by weight, and any ammonia content to below 0.2% by weight.

15. A method according to claim 14, in which the composition supplied to the extruder includes a quantity of water of up to 20% by weight of the total weight of the composition.

16. A method for the preparation of a polymer composition useful for the production of articles of biodegradable plastics material, comprising the steps of:
   a. mixing a composition including starch, a copolymer selected from the group consisting of ethylene-vinyl acetate, having a vinyl acetate molar content of from 5 to 90%, modified ethylene-vinyl acetate having from 5 to 90% of hydrolyzed acetate groups, ethylene-glycidyl acrylate, ethylene-methyl methacrylate, ethylene-maleic anhydride and mixtures thereof, water, and optionally urea, ammonia or a mixture thereof, in an extruder heated to a temperature of between 80° and 180° C., and
   b. bringing the water content to below 6% by weight, and any ammonia content to below 0.2% by weight, wherein the composition fed to the extruder further includes up to 40% wt of an ethylene-vinyl alcohol copolymer with respect to the total weight of the composition.

17. A method according to claim 16, wherein the ethylene copolymer portion of the composition consists of ethylene-vinyl alcohol and ethylene-vinyl acetate in a weight ratio of from 2:1 and 8:1.

18. A method according to claim 16, wherein the ethylene copolymer portion of the composition consists of ethylene-vinyl alcohol, ethylene-vinyl acetate and modified ethylene-vinyl acetate.

19. A method according to claim 14, wherein the ethylene copolymer and the starch in the composition are present in a weight ratio of from 1:9 to 9:1.

20. A method according to claim 19, wherein the ethylene copolymer and the starch in the composition are present in a weight ratio of from 1:4 to 4:1.

21. A method for the preparation of a polymer composition useful for the production of articles of biodegradable plastics material, comprising the steps of:
   a. mixing a composition including starch, a copolymer selected from the group consisting of ethylene-vinyl acetate, having a vinyl acetate molar content of from 5 to 90%, modified ethylene-vinyl acetate having from 5 to 90% of hydrolyzed acetate groups, ethylene-glycidyl acrylate, ethylene-methyl methacrylate, ethylene-maleic anhydride and mixtures thereof, water, and a starch destructuring agent selected from the group consisting of urea, alkali metal hydroxides, alkaline earth metal hydroxides and ammonia, in an extruder heated to a temperature of between 80° and 180° C., and
   b. bringing the water content to below 6% by weight, and any ammonia content to below 0.2% by weight.

22. A method according to claim 21, wherein said urea is present in said composition in a quantity of up to 20% by weight, based on the weight of said starch.

23. A method according to claim 14, in which said composition supplied to said extruder includes a high boiling plasticizer in an amount from 0.05 to 100% by weight of the weight of the starch present in said composition.

24. A method according to claim 23, wherein said plasticizer is selected from the group consisting of polyethylene glycol, ethylene glycol, propylene glycol, sorbitol and glycerine.

* * * * *